March 2, 1937.  C. P. LENT  2,072,522
DISPENSING AND MEASURING GASOLINE OR THE LIKE
Filed May 16, 1935  4 Sheets-Sheet 1
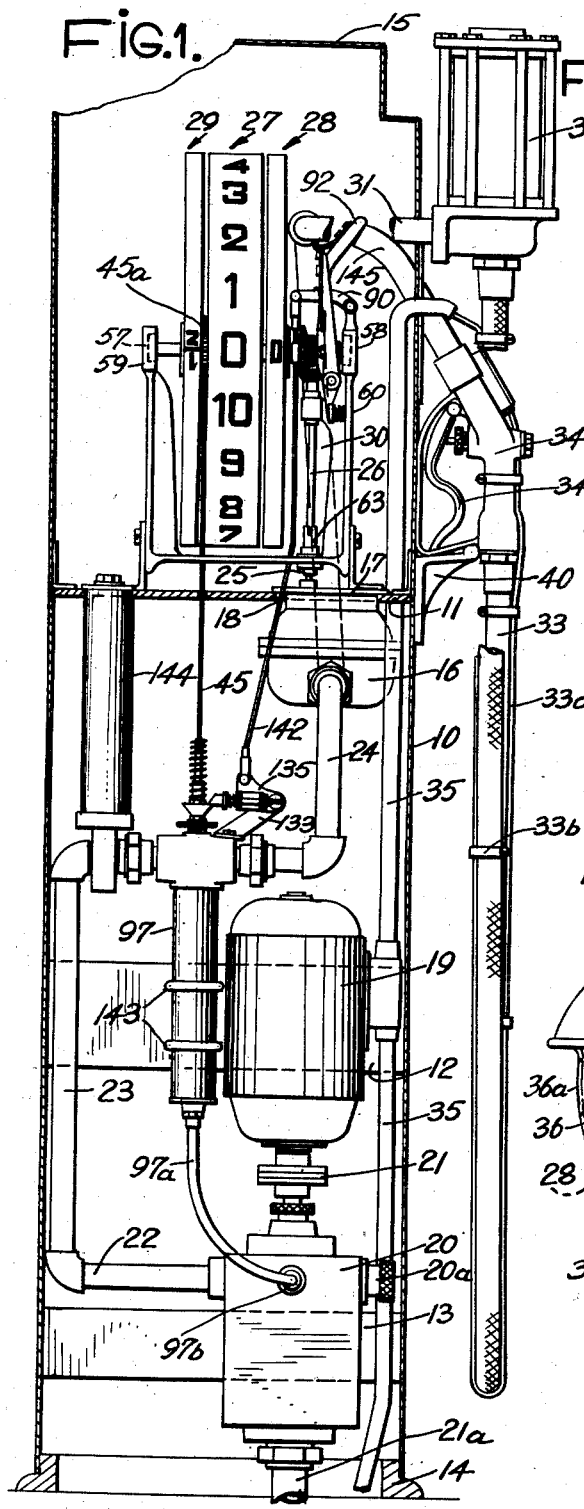
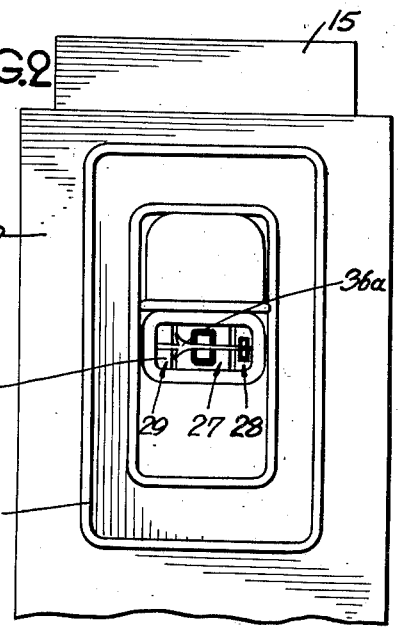
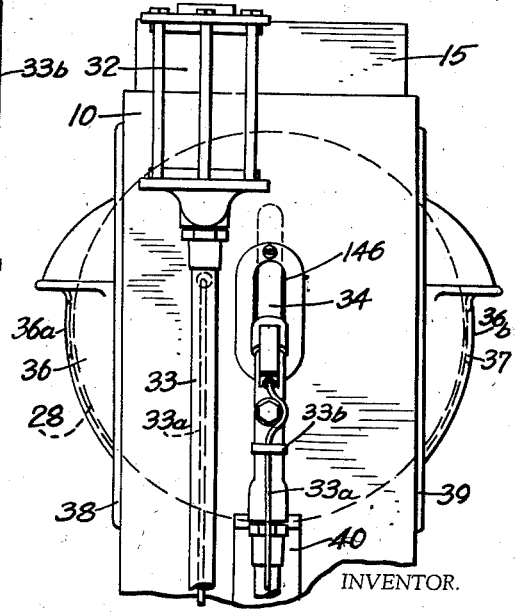
INVENTOR.
COS P. LENT.
BY
ATTORNEY.

March 2, 1937. C. P. LENT 2,072,522
DISPENSING AND MEASURING GASOLINE OR THE LIKE
Filed May 16, 1935 4 Sheets-Sheet 2
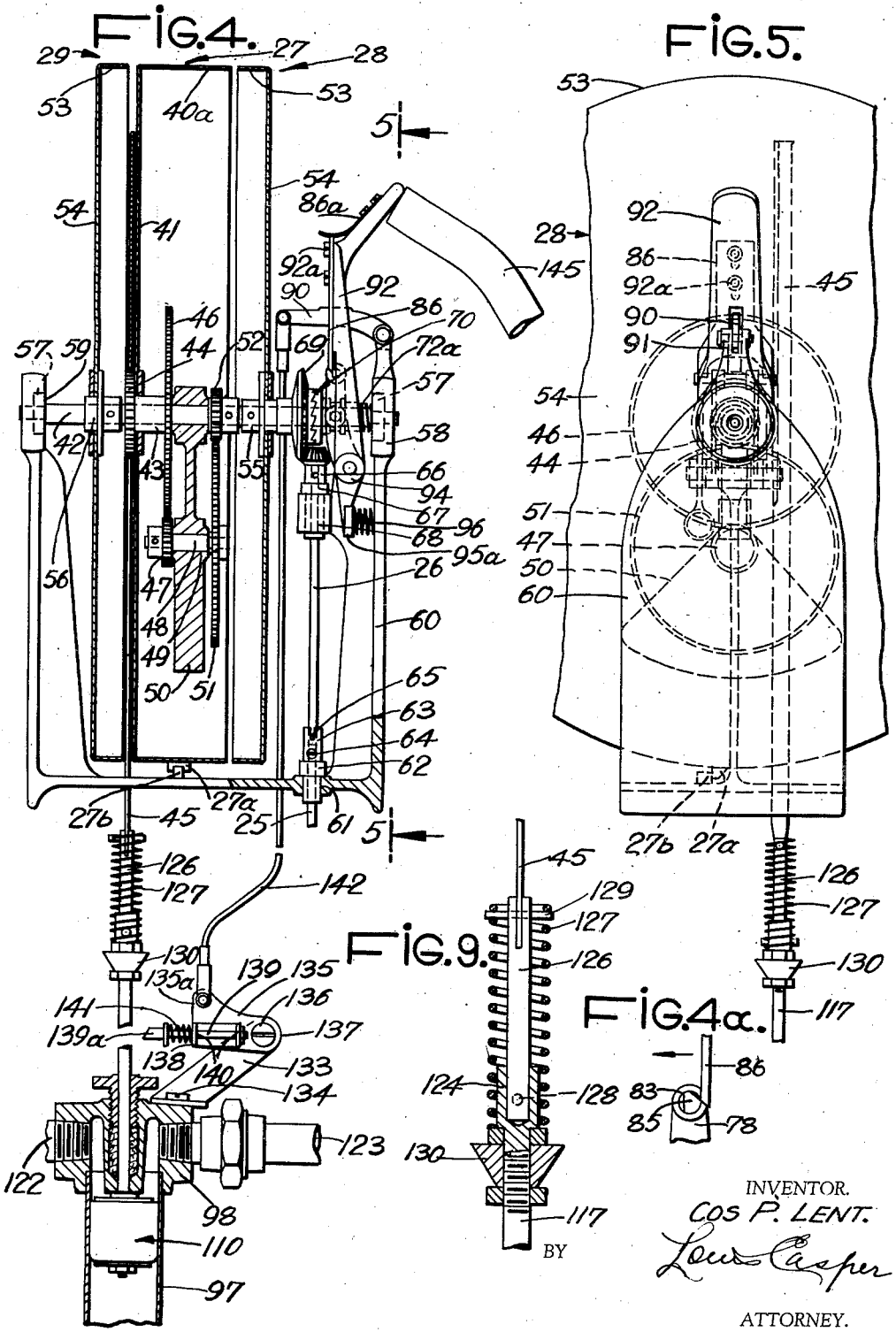
INVENTOR.
COS P. LENT.
BY Louis Casper
ATTORNEY.

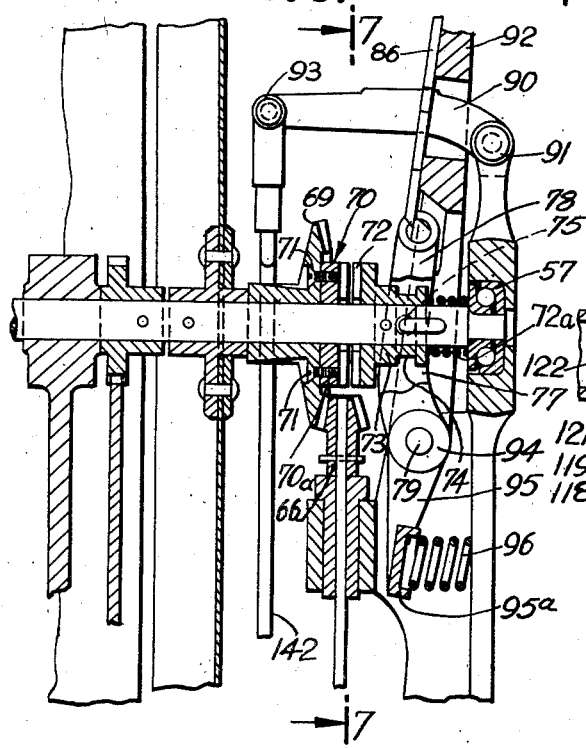

March 2, 1937. C. P. LENT 2,072,522
DISPENSING AND MEASURING GASOLINE OR THE LIKE
Filed May 16, 1935 4 Sheets-Sheet 4
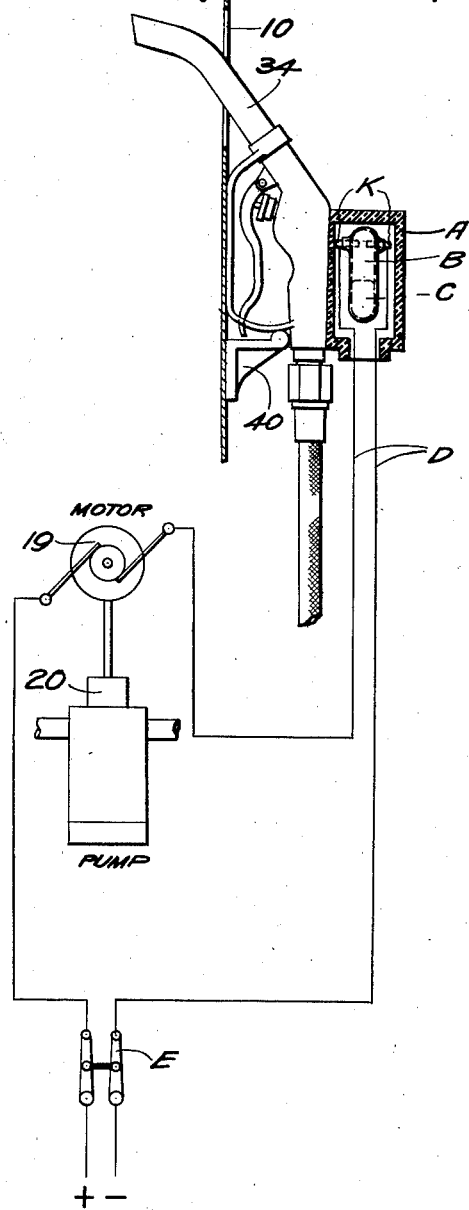
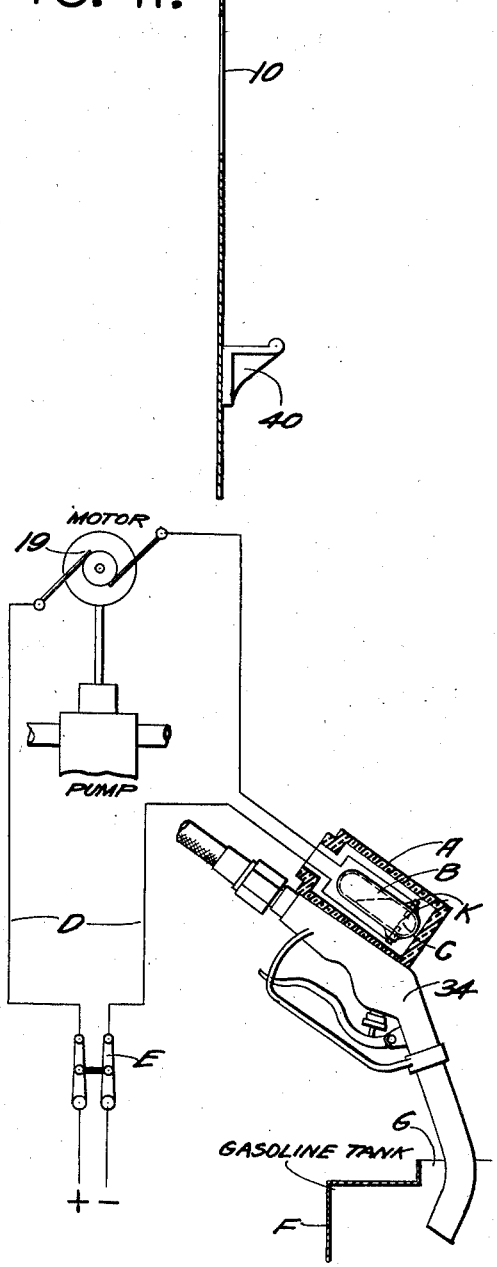
INVENTOR.
COS P. LENT.
BY
ATTORNEY.

Patented Mar. 2, 1937

2,072,522

UNITED STATES PATENT OFFICE 2,072,522

DISPENSING AND MEASURING GASOLINE OR THE LIKE

Cos P. Lent, New York, N. Y.

Application May 16, 1935, Serial No. 21,779

6 Claims. (Cl. 221—95)

My invention relates to an apparatus for dispensing and measuring gasoline or the like.

By means of a novel arrangement including indicating mechanisms and a pump operated by an electric motor, an attendant is enabled to deliver gasoline or the like in measured quantity into the tank of an automobile or the like, by simply removing the delivery nozzle from its normal hooked position and placing it into the filler opening of the tank aforesaid and then opening the nozzle valve.

A further object of my invention is the construction of a stationary apparatus for measuring the gasoline outflow with the elimination of all operating parts exterior to the shell or walls of said apparatus.

A further object of my invention is to employ a system of indicating dials of comparatively simple construction that will perform their indicating functions in accord with the flow of gasoline or the like through said apparatus and will afterward restore themselves to a zero setting in readiness for the next outflow of supply of gasoline from the apparatus aforesaid.

This and other objects will appear in the consideration of this specification and the drawings which accompany the same in which—

Fig. 1 is a front cross-section view of the indicating and dispensing apparatus including an electric motor, a pump operated therefrom, connecting pipes, a measuring meter, indicator dials and the delivery nozzle.

Fig. 2 is an exterior front view of the measuring dial proper.

Fig. 3 is a partial exterior side view of the measuring and dispensing apparatus showing the measuring meter in further detail.

Fig. 4 is a cross-sectional view showing the indicating dials, operating mechanisms in connection therewith; also illustrating the operating means for restoring the indicating dials to their zero position.

Fig. 4a is a detail showing the relative position of the lower arm portion 78 with reference to the lever extension 86.

Fig. 5 is a side sectional view of the apparatus taken on a line 5—5 of Fig. 4.

Fig. 6 is an enlarged sectional view detailing the mechanism involved in actuating the indicating dials.

Fig. 6a is a view similar to Fig. 4a, showing the position of the lower arm portion 78 relative to the lever extension 86.

Fig. 7 is a sectional view taken on a line 7—7 of Fig. 6.

Fig. 8 is an enlarged sectional view showing particularly the automatic setting cylinder and the position of the operating piston that corresponds to the "zero" reading position on the measuring dial.

Fig. 9 is a detail view of the "zero" restoring shaft at a position corresponding to the reading of the dial at any instant of time during the period of delivery of the gasoline or the like through the dispensing apparatus.

Fig. 10 is a diagrammatic view including the delivery nozzle showing the switching connection relation of said nozzle with the electric motor 19.

Fig. 11 is a view similar to that shown in Fig. 10 except that the nozzle 34 is in a position in readiness to deliver gasoline into a gasoline tank.

Referring to the drawings, the gasoline dispensing and indicating device shown in Fig. 1 consists of an outer shell or wall 10 which is securely held together by means of cross members 11, 12 and 13. The bottom section of the shell 10 rests on a base casting 14. The upper section of the shell is covered by means of a cover plate 15.

A measuring meter 16 is secured to the cross member 11. The top section 17 of the meter 16 protrudes through an opening 18 of the cross member 11.

An electric motor 19 is secured to the cross member 12. The said motor operates the pump 20 through the medium of flexible coupling 21. The pump draws up the gasoline from a tank not shown which is connected to said pump through the supply pipe 21a.

The pump 20 forces the gasoline to flow through the connecting pipes 22, 23 and 24, and from thence to the measuring meter 16. The said meter is connected through the medium of shaft 25, coupling 63 and shaft 26 to a set of dials 27, 28, and 29. The operation of these dials will be described hereinafter.

A measured quantity of gasoline or the like flows from the meter 16 through the pipes 30 and 31 to the visible glass cylinder 32 and from thence through the flexible hose 33 to the delivery nozzle 34.

Electric current supply is connected to the motor 19 through wire conductors in conduit 35 and said motor is operated in a similar manner to that described in my Patent No. 1,978,753 patented Oct. 30, 1934. The present application is subject to the aforesaid patent. The electric motor, however may be operated automatically or mechanically by means other than that described in the patent aforesaid.

The numerals indicated on the indicating dials 27, 28 and 29 correspond to the amount of gasoline that has been delivered to the filler tank and are observed through the openings 36 and 37 at the gallon pointer indicator 38 and 39. The numerals aforesaid are observable at either side of the apparatus.

The delivery nozzle 34 when not in use is placed on the hook 40 as shown in Fig. 1.

The numeral 36ᵃ is a stationary pointer that is observable through the opening 36.

Referring to Fig. 4, the "gallon" reading dial 27 is made up of a flat ring 40ᵃ upon which graduated markings are affixed thereon and in which in this case the said markings are indicated from "0" to "10" gallons for each half of the dial.

As already stated the indications are observable at both sides of the apparatus. The ring 40ᵃ and the side member 41, (Fig. 4), are loosely mounted to the driving shaft 42 through the bushing 43.

Mounted at the left of the bushing 43 is a gear wheel 44 which engages a geared rack bar 45. There is also mounted on the bushing 43 a gear 46 which engages the pinion gear 47. The gear 47 is attached to the shaft 48 that turns in a bearing 49 of the casting 50. The shaft 48 also carries the gear 51 which engages with the driving gear 52, the latter gear being rigidly attached to the driving shaft 42. The numerals 27ᵃ and 27ᵇ are stops for the "gallon" reading dial guiding the same to the zero or restoring position. (See Fig. 5.)

The fractional gallon reading dials 28 and 29 are provided for the front and for the rear of the delivery apparatus. The dials consist substantially of flat rings upon which the markings are affixed, reading preferably "0", "¼", "½", "¾", of a gallon. In addition to the foregoing a supporting side member 54 is provided. The dials 28 and 29 are rigidly attached to the driving shaft 42 through the medium of the bushings 55 and 56.

The driving shaft 42 turns on a pair of roller bearings 57 which are held into the side lugs 58 and 59 of the casting 60. A bore 61 at the bottom of the casting 60 has a bushing 62 into which the shaft 25 of the measuring meter 16 projects. The shaft 25 is secured to a flexible coupling 63 by means of a pin 65. A driving pinion 66 is rigidly connected to the shaft 26 which turns in a bushing 67 that is held in a bearing 68 of the casting 60.

The pinion 66 drives a bevel gear 69 which turns loosely on the shaft 42. A toothed coupling 70, (see Fig. 6) has one section thereof 70ᵃ secured to the bevel gear 69 by means of the screws 71. The opposite section 72 of the coupling 70 is slidably mounted on the shaft 42.

The coupling member 72 is provided with an extension section 73 having a circular disposed groove 74. The said coupling member is held in the position shown in Fig. 4 by means of the pressure of the spring 72ᵃ.

Circular pins 75 and 76 are riveted to the arms 77 and 78 respectively. The latter pins move slidably in the groove 74, (Fig. 4). The lower portion of the arms aforesaid designated as 77 and 78 are pivoted to a shaft 79, the latter being held in a bearing 80 of the casting 60. Oppositely disposed sections 81 and 82 are secured to a cross shaft 83. The end sections 84 and 85 of the shaft 83 are notched for the purpose of providing a resting surface for the lever extension 86 that is slidably held on the lever 92 by means of the screws 92ᵃ (see Fig. 4). The extension 86 is provided with notched legs 87 and 88. The said lever extension is held in downward resilient tension through the medium of the flat spring 86ᵃ. The lever extension 86 is also provided with a slot 89 into which is fitted a lifting arm 90 to which is joined a connecting rod 142 at the joint bearing 93, (see Fig. 6).

An extension section 95 of the lever arm 92 swings on the shaft 79, said extension arm being provided with a circular hollowed section 95ᵃ that supports a spiral spring 96 which holds arm 95 and section 92 thereof substantially in the position shown in Fig. 6.

Referring to Fig. 8. In the latter figure is shown the pressure cylinder 97 the function of which is to restore the indicating dials to their zero resting positions. The upper section of the cylinder 97 is secured in a casting 98. The lower section of said cylinder is sealed by means of a threaded bushing 99 to which a pipe fitting 100 is connected. The cylinder is provided with a piston 110 made up of a series of rings 111, 112 and 113, the functions of which is to maintain to a tight fit a leather bushing 114 or the like against the walls of the cylinder 97. The aforesaid rings are held together on the shaft 115 by the tightening of the nut 116 upon the shaft aforesaid. An extended section 117 of the shaft 115 projects through a stuffing box 119 which is integral to the casting 98. A threaded cup 120 serves to compress the stuffing material into the opening 121 of that portion of the casting 98 designated by the numeral 118 thus maintaining a tight seat. On each side of the casting 98 threaded pipe fittings 122 and 123 are provided.

The upper section of the shaft 117 has an enlarged joint member 124 attached to it, the latter having a circular groove 125. A shaft 126 is slidably mounted inside the groove 125.

The shaft 126 is substantially held against the shaft 117 by means of the tension of the coiled spring 127 which is secured to the bushing 125 by means of the pin 128, and is further held to the shaft 126 by means of the pin 129, (see Fig. 9).

As already stated, the narrow geared rack 45 is secured to the shaft 126. (See Fig. 9.) It will be observed in Fig. 8 a section of the shaft 117 below the enlarged joint member 124 is threaded. A tapered block 130 is held in position on the shaft 117 by means of the lock nuts 131 and 132. A bracket arm 133, (see Fig. 4) is secured to the casting 98 by means of the screw 134. A lever 135 is pivotally mounted on the bracket 133 at the pivot bearing 137. The lever 135 is provided with a U-shaped bracket extension 138. A square rod 139 moves slidably in the opening 140 provided for it in the bracket arm 135 and is held in position shown in Figs. 4 and 8 by means of the tension of the spiral spring 141.

The rod 139 terminates with a tapered section 139ᵃ.

The upper section of the lever 135 is connected to the lifting rod 142 which is secured at the pivot bearing 135ᵃ. The lifting rod aforesaid is pivotally connected with the lifting arm 90. The cylinder 97 is mounted inside of the delivery tank shell 10, (Fig. 1) being secured to the supporting cross member 12 by means of the staples 143. A compressed air cylinder 144 is mounted in position between the delivery pipe 23 and the cylinder 97. The function of the cylinder aforesaid will be hereinafter described.

The gasoline flow indicating device as shown in Figs. 1 to 9 inclusive is applicable for use in connection with the automatic starting delivery nozzle which is embodied in my Patent No. 1,978,-753.

In Figs. 10 and 11 the nozzle 34 which is hung on the supporting bracket 40 is provided with an insulated switch box A. A mercury switch B is enclosed within said box. There are two contacts K and a quantity of mercury C within said switch container. Electric wires D lead from the contacts K and form a circuit including the main line switch E which is connected to the power main and with the motor 19.

When the mercury inside the mercury switch B is at the bottom of the switch container, the contacts K are disconnected and as a consequence the motor 19 is cut off from the electric current supply and is thus made inoperative.

When the nozzle 34 is lifted from the bracket 40 and inserted into the automobile gasoline tank F through the opening G (see Fig. 11), the mercury C inside the switch container B by reason of gravity flows to the opposite end of the switch and in this manner closes the contacts K thereby causing an electric current to flow thus energizing the motor 19 which operates the pump 20.

In my Patent No. 1,978,753 it is stated that the mercury switch can be replaced with a gravity operating switch.

The wires leading from the nozzle to the motor 19 can be embedded inside the fabric of the delivery hose instead of being attached to the outer surface of the same in the manner shown.

The operation of the gasoline dispensing and measuring apparatus is as follows:

The indicating dials are shown in Fig. 1 at a zero or "no delivery" position. When the apparatus is in the position as stated, the tip end 145 of the dispensing nozzle 34 contacts with the lever 92, the effect of which is to hold said lever in an opposite position to that shown in Fig. 6. When the lever 92 is moved in the latter position, the lever extension 86 rides over the tapered section 85 of the shaft 83, (see Figs. 6ª and 4ª) and then drops to the opposite side of the shaft 83 under tension of the spring 86ª, (see Fig. 4).

When the attendant desires to hang up the delivery nozzle after the delivery of gasoline shall have been made, he inserts the tip 145 of the nozzle 34 through the opening 146 at one side of the apparatus.

At the expiration of each delivery of gasoline, and while the attendant releases the valve handle 34ª and hangs the nozzle 34 to the apparatus shell stand 10, the electric motor 19 will continue to operate for a brief period.

During this brief period a portion of the gasoline that has been pumped by the pump 20 returns to the gasoline retainer by way of the safety valve 20ª. Another portion of the gasoline compresses the air in the compression cylinder 144.

When the attendant proceeds to make a further delivery of gasoline, he removes the dispensing nozzle 34 from the apparatus shell stand 10. The instant the tip 145 of the nozzle leaves the lever 92, (the latter being under the influence of the spring 96), the said lever comes to rest in the position shown in Fig. 6.

In this connection it will be understood that the lever extension 86, which is held to the lever 92 by means of the screws 92ª brings the shaft arms 78 and 79 into the position shown in Fig. 6, and disconnects the coupling member 72 from the adjacent coupling member 70 which in turn disconnects the driving shaft 42 from the engaging bevel gears 66 and 69.

The driving shaft 42 being disconnected from the bevel gears 66 and 69 is brought under the influence of the pressure exercised on the piston 110 by the gasoline proper. The pressure aforesaid is caused by the accumulated air in the compression chamber of the cylinder 144. The effect of the pressure as stated is to restore the "gallon" reading dial 27 and the fractional gallon dials 28 and 29 to their respective zero positions by means of the gear 44 and geared rack 45 connected to the shaft 126.

The zero restoring mechanism operates rapidly, so that by the time the attendant inserts the delivery nozzle into the filler opening of the delivery tank for gasoline delivery, the dials are automatically and precisely restored to zero.

The length of the cylinder 97 is a trifle longer than is necessary to restore the dials to the zero reading position, therefore, when the piston 110 is down to its lowest limit, the spring 127 is brought under tension, (see Fig. 8).

The attendant starts the delivery of gasoline by lifting the nozzle 34 from the hook and he then depresses the valve lever 34ª of said nozzle, and, as the gasoline continues to flow out of the flexible hose 33, the air pressure inside the cylinder 97 tends to decrease which results in the eventual return of the shaft 117 to the position shown in Fig. 9.

During the operations just described, the tapered block 130 lifts the lever 139ª momentarily to the position shown in dotted line in Fig. 8, and said lever is then restored to its normal position as shown. The shaft 142 being connected to the lever 135 lifts the lever extension 86 and disconnects the members 87 and 88 from the end sections 84 and 85 of the said lever extension 86.

The arms 77 and 78 under the influence of the spring 72ª are released from the lever extension 86, (Fig. 6ª). The coupling member 72 comes into engagement again with the coupling 70ª, thus restoring the connection of the dials to the measuring meter 16. The amount of gasoline lost during the foregoing described operation of lifting the lever 90 is suitably taken care of on the gasoline markings on the dial.

During the delivery period of the gasoline the measuring meter shaft 25 revolves the flexible coupling 63, the shaft 26 and the beveled gear 66 respectively. This in turn rotates the bevel gear 69, the latter being rigidly connected by means of the couplings 70ª and 72 to the shaft 42, rotates the fractional gallon dials 28 and 29, likewise the gallon dial 27 through the train of gears, said train comprising gears 52, 51, 47 and 46.

It will thus be seen that this invention provides a measuring apparatus for gasoline or the like free from mechanical actuating means to restore the recording dials to their zero or initial position; and it will also be seen that this invention is a liquid measuring and dial restoring apparatus operating through the medium of the liquid that the measuring apparatus dispenses.

Now having described my invention, what I claim as new is:

1. In an apparatus for dispensing gasoline or the like in measured quantities; a motor operated pump, a reservoir connected to said pump; a cylinder also connected to said pump; a piston in said cylinder made operative by the gasoline flow from said pump, said piston having stored pressure means for restoring a series of registering dials back to a "zero" reading, said stored pressure means remaining operatively effective after the dispensing of said gasoline from the apparatus aforesaid and after the operation of said motor pump shall have been stopped.

2. In an apparatus for dispensing gasoline or the like having a housing therefor; a motor operated pump, a reservoir in connection therewith, gasoline delivery means in connection with said reservoir, said delivery means including a flexible hose having a delivery nozzle attached thereto; driving means for operating a series of indicating dials, said driving means operable in accordance with the flow of said gasoline from the apparatus aforesaid; and means for restoring said dials to their original zero indicating positions after the delivery of gasoline shall have been made, said means comprising a coupling and a coupling operating arm for connecting and disconnecting said dials from the driving means aforesaid, said arm operated by the tip of said nozzle when said nozzle is placed in resting or non-dispensing position in the housing aforesaid.

3. In an apparatus of the class described having a housing therefor; a motor operated pump, a gasoline meter connected to said pump; a delivery hose having a nozzle attached thereto connected to said meter; a hanging hook for said nozzle included in said housing; a series of indicating dials also included in said housing, said dials operable by said meter controllable by the flow of gasoline therethrough; means for restoring said dials to a zero or initial position, said restoring means comprising an arm operating a coupling connecting the gasoline registering meter to the dials aforesaid, said arm operated by the tip of said nozzle when said nozzle is hung onto the hanging hook aforesaid.

4. In an apparatus for dispensing gasoline or the like having a housing therefor; means contained in said housing to cause a flow of gasoline which operates a series of indicating dials; said dials rotating in direct proportion to the amount of gasoline dispensed from the apparatus aforesaid; said flow of gasoline made possible by a motor operated pump, a cylinder connected to said pump; an air compression chamber also connected to said pump; said cylinder having a piston, said piston having means for restoring said dials to their original positions, said means actuated by the pressure exercised by the compressed air and gasoline against said piston inside said cylinder.

5. In an apparatus for dispensing gasoline or the like, said apparatus having a pump, said pump having a pressure regulating valve; means included in said apparatus for operating a set of indicating dials for indicating the amount of gasoline pumped from said apparatus, said means being operated by the flow of gasoline, said flow due to the operation of said pump, a cylinder having a piston therein also connected to said pump, said piston having a driving shaft with a geared rack integral thereto, gearing means coupled to said rack and operable by means of said rack for resetting said indicating dials to their initial or starting positions; and means provided to cause the gasoline inside said cylinder to be maintained at constant pressure, said constant pressure caused primarily by compressed air contained inside a compression chamber that is connected to said cylinder and the flow of gasoline through the pressure regulating valve aforesaid.

6. In an apparatus of the class described comprising a reservoir, a pump connected to said reservoir, a measuring meter having indicating dials therein, said meter connected to said pump and made operable by means of gasoline flowing through said meter from said pump; a cylinder having a piston that is also connected to said pump, said piston made operable by means of the pressure of gasoline inside said cylinder, said pressure being produced by the flow of gasoline into an air compression chamber that is connected to said cylinder, said piston having a shaft and geared rack integral thereto, said rack in operable engagement with a train of gears that operate said indicating dials for the purpose of resetting said dials to their initial or starting positions.

COS P. LENT.